United States Patent [19]

Cases et al.

[11] 4,250,027

[45] Feb. 10, 1981

[54] METHOD FOR RECOVERING THE LEAD AND ZINC VALUES IN SECONDARY SCRUBBER MUDS FROM BLAST FURNACE GASES

[75] Inventors: Jean M. Cases; Georges Valence, both of Vandoeuvre; Olivier Lietard, Precy sur Oise, all of France

[73] Assignee: Agence Nationale de Valorisation de la Recherche (ANVAR), Neuilly sur Seine, France

[21] Appl. No.: 7,182

[22] Filed: Jan. 29, 1979

[30] Foreign Application Priority Data

Jan. 31, 1978 [FR] France .................. 78 02676

[51] Int. Cl.³ .................................... B07B 1/00
[52] U.S. Cl. ........................... 209/233; 209/2; 241/22; 241/24; 75/25
[58] Field of Search .............. 209/5, 211, 2, 233, 209/237, 268; 241/14, 16, 20, 22, 24, 26, 30; 75/25; 55/72

[56] References Cited

U.S. PATENT DOCUMENTS

| | | | |
|---|---|---|---|
| 3,865,316 | 2/1975 | Hartstein et al. | 241/22 |
| 4,018,680 | 4/1977 | Kupfer | 75/25 X |
| 4,134,755 | 1/1979 | Maeda | 75/25 |

FOREIGN PATENT DOCUMENTS

| | | | |
|---|---|---|---|
| 2456595 | 6/1975 | Fed. Rep. of Germany | 55/72 |
| 2603096 | 7/1976 | Fed. Rep. of Germany | 209/211 |

Primary Examiner—Ralph J. Hill
Attorney, Agent, or Firm—Oblon, Fisher, Spivak, McClelland & Maier

[57] ABSTRACT

The method consists of subjecting said muds to a particle size grading to concentrate the lead and zinc contained notably in the fines, and recovering said fraction containing the lead and the zinc, the other fraction being recyclable to the blast furnaces. The invention is useful in the preparation of feed materials for Waelz-Berzelius furnaces.

5 Claims, 12 Drawing Figures

METHOD FOR RECOVERING THE LEAD AND ZINC VALUES IN SECONDARY SCRUBBER MUDS FROM BLAST FURNACE GASES

BACKGROUND OF THE INVENTION

1. Field of the Invention

The present invention relates to a method for recovering lead and zinc values contained in secondary scrubber sludges or muds from blast furnace gases.

2. Description of the Prior Art

The smokes produced during the manufacture of cast iron and steel cannot be discharged into the atmosphere except after having undergone dust removal treatment. The methods and equipment enabling this operation to be effected then ensure discharge to the atmosphere in accordance with the regulation standards, whilst the dusts, generally trapped in a wet medium, are extracted and recovered in the form of muds. These muds, called secondary scrubber muds, are generally constituted by elements of the blast furnace charge (iron ores, more or less reduced agglomerates, coke, and similars and nonferrous metals such as lead and zinc. They are, according to their iron content, either recycled after agglomeration, or abandoned for discharge into the open air. In the first case, the recycling increases the proportion of zinc and of lead of the ores charged into the blast furnace, which causes considerable disturbances in its operation through attack of the walls, the slowing down of the transit of the ore by clogging up, the presence of injurious vapors during casting and degradation of the quality of the cast iron and the steel. In the second case, the abandonment on slag heaps of noxious muds causes the pollution of rivers and of water-bearing layers.

The production of muds is in the vicinity of 2 to 3 kg of dry matter per ton of hematite cast iron and 5 kg per ton of phosphorous cast iron; the contents being variable from 3 to 25% of zinc and 1 to 9% of lead and confer on these muds the character of ores rich in these elements. Considering the European production of cast iron, the processing of these muds for the recovery of these metals is of high economic interest and contributes, as has already been indicated above, to the battle against pollution, to the improvement of the operation of iron and steel works and to the integral recycling of the residues.

The methods for recovering zinc and lead values from dusts of iron metallurgy plants comprise processing methods by the dry route and processing methods by the wet route.

Among the methods by the dry route, there may be mentioned notably:

the chlorination processing method according to NEUHAUS et al. (Stahl. Eisen. All., 78 (1958) pp 1662-1670) in which the use of $MgCl_2$, $CaCl_2$ and $NH_4Cl$ in the agglomeration of the muds enables the recovery of zinc and lead values. For example, the addition of 3% of $CaCl_2$ into a mixture to be agglomerated including 10% of blast furnace gas scrubber muds enables the removal of 66% of the zinc and 90% of the lead.

firing and fusion of pellets in a 15 KVA furnace according to PINAEV A. K. [Stahl. (URSS) 11 (1972) pp 1056-1057] enables the obtaining of a 98% iron alloy and a recovery of 95% of the zinc.

reduction in a rotary furnace by the method of MEYER et al [Stahl. Eisen. All., 96 (1976) p 1228-1233] or that of SUGASAWA et al. [Comm. Seminar on the utilization of prereducted materials in iron and steel making. Bucarest, 27–28 May 1976. CEE Steel/SEM/2-/RI, 7 pages].

In Europe, outstanding research has been carried out in the use of the Waelz Berzelius furnace [E. GORY—Treatment of muds and dusts from iron metallurgy—Association Technique da la siderurgie francaise, Commission de l'environnement EV SO—June 1975] for the recovery of the metals contained in zinc ores which are low grade and of small particle size and in zinc- and lead-containing residues (ashes and slags). It is observed however that the commercial benefits of this furnace can only be ensured if the input contents of lead and of zinc are sufficient and higher than 10%.

The reduction process in a vertical column of the New Jersey type ["Zinc and its Metallurgy"—Author:-Centre Technique de zinc. Ed. CT 2-34, rue Collange 92307 LEVALLOIS PERRET 4th edition-June 1974].

Among the wet processing methods, may be mentioned notably:

the extraction of the zinc and the lead by means of ammoniacal solutions of ammonium carbonate (WAGNER et al. Recherche CECA No. 235 (1976)), extraction by means of sodium solutions (HISSEL et al. Recherche CECA No. 6252 12/2/235 1976).

The majority of the above mentioned methods are not of much interest for economical reasons.

On the other hand account should be taken, by way of prior art, of the following publications:

French Patent Application No. 77-25788, wherein a process is described enabling the selective removal of the zinc from the recovered dusts of iron metallurgy.

This process includes a complex series of operations and necessitates fine pulverization of all the dust to be processed and, without alluding to any granulometric cut, makes use of wet grading which must be carried out under vacuum. Moreover, it does not permit the separation of the lead and lead compounds at the same time.

DE-AS 1,170,648, in which a process is described for removing the dust by the wet route from the residual gases containing lead and zinc. This process ensures the selective separation by the hydrometallurgical route (leaching of the dusts with $H_2SO_4$ and sodium solutions) of the lead and of the zinc.

DE-AS 1,533,070, in which a process is described for the treatment of metal-containing fine dusts. This process only involves ideas of granulometry to distinguish the various degrees of humidity to be respected, which is considered as the essential variable. This process brings into action also a prior mixing of the muds with finely divided solid reducing agents, and then, after adjustment to the typical and optimal degree of humidity according to the granulometric spectrum of the dusts and/or the treated muds, drying in a straight oven and fusion in a reducing atmosphere of the agglomerated powders, thus producing volatilization of the lead and of the zinc.

U.S. Pat. Nos. 3,524,743 and 3,547,623 which, both, relate to processes for suitably agglomerating metal containing muds (by the addition of specific reactants before introduction into a suitable furnace) and specify what must be the conditions of reduction; the processes applied work by pyrometallurgy.

French Patent Application No. 76-02193, in which a process is described for treating powders containing metals (such as lead, zinc, iron and the like), which include the application of powders composed on the one hand of extremely fine particles ranging from 2 to 3 μm and on the other hand coarse particles of about 1 mm and relies on conversion of these powders into a mud having well-defined concentration characteristics and itself intended to undergo classifying or hydraulic grading. Thus, it is proposed to put all of the extremely fine particles and coarse particles in the form of a mud having a solid concentration not exceeding 50% and, after having subjected the thus constituted mud to hydraulic classification, to collect, at the upper part of the hydraulic grading plant, a material enriched in zinc and in lead. According to this method, the overall concentration in solids of the mud and not the particle sizes of the solid particles is involved. Moreover, the obligation imposed of dealing with two groups of very highly differentiated solid particles is purely an idea, which does not correspond at all to reality; now, if this restriction is not respected, the process described in this document is inoperative and furthermore does not take into account of the state of the muds, which may be flocculated or not.

There has now been found a simple method which enables the production, from secondary scrubber muds of blast furnace gases, on the one hand, of a product having a higher content in lead and in zinc which can then be treated for the recovery of the lead and of the zinc, and on the other hand, of a residue having a lower content in lead and zinc which is recyclable for feeding the blast furnace.

It has in fact been found, unexpectedly, that the non-ferrous metals, such as zinc and lead, have a tendency to be concentrated in the fines when their content increases in said muds.

The method according to the present invention is defined as being a method of preconcentration by a physical route and essentially cconsists of subjecting blast furnace scrubber muds to particle size gradings so as to concentrate the lead and the zinc contained notably in the fines, and in recovering the fraction containing the lead and the zinc, the other fraction being recyclable to the blast furnace. Basically, there is recovered, as a fraction containing lead and zinc, the fraction whose particle size is less than about 50 μm and essentially in practice the fraction whose particle size is less than a value comprised between about 10 and 50 μm.

The muds applied in the method of the invention are secondary scrubber muds from blast furnace gases, which are flocculated or not.

The particle size grading may be carried out in a single step or in several steps. For example, in one embodiment of the method according to the invention, it may be advantageous to subject the muds previously to a particle size grading by separation at a value comprised between about 80 and 150 μm and then to continue with a particle size grading at a value comprised between about 10 and 50 μm, preferably between about 20 and 50 μm, of the fraction resulting from the prior step and possessing a particular size less than about 80–150 μm.

This prior particle size grading is not essential in all cases; examination of the mineralogic and granulometric characteristics of the muds to be processed enables a decision to be made of the opportuneness of this separation at a particle size value between about 80 and 150 μm.

The fraction of coarsest particle size thus obtained is processed for the recovery of solid material (decantation or filtration) which could then be recycled, after agglomeration, for feeding the blast furnace.

The particle size gradings may be effected by any suitable means. It is possible, for example, to carry out the particle size grading by shifting by means of a series of conventional sieves (+250 μm; +104–250 μm; +63–140 μm; +37–63 μm and 0–37 μm).

These particle size gradings may also be effected by centrifugation in a static apparatus, such as by means of a cyclone or by cycloning. It has been found that the latter mode of particle size grading is as efficient with the muds obtained after the addition of flocculating agents as with naturally decanted muds. It results therefrom that the method of the invention may be applied without modification in presently existing mud recovery installations. Other methods of particle size grading may be used for the application of the method of the invention. It may be judicious, according to the selected separation method, to add to the flocculated muds coming from existing installations products causing the deflocculation and the dispersion of the constituent solid particles of the mud. By way of example of such a product, may be mentioned polyphosphate based products.

When the processing is by cycloning, it may be advantageous to subject the fraction of particle size lower than the particle size value of about 20–50 μm, to a subsequent separation at about 10 μm.

The term "cycloning" designated a single cycloning as well as successive cyclonings.

The fractions of particle size lower than the particle size value of about 20–50 μm or of about 10 μm constitute muds preconcentrated in zinc and in lead and may be used for the recovery of the zinc and of the lead, whereas the fractions of particle size higher than the particle size value of 20–50 μm or of 10 μm may be recycled for feeding the blast furnaces.

In a particularly preferred embodiment of the method according to the invention, blast furnace gas scrubber muds are subjected to the following steps:

(1) particle size grading by separation at a particle size value comprised between about 10 and 50 μm after, if necessary, a prior separation at about 80–150 μm;

(2) processing by attrition of the fraction having a particle size higher than the particle size value of about 10–50 μm;

(3) particle size grading of the fraction resulting from step (2) at a particle size value comprised between about 10–50 μm;

(4) recycling to the feed for the blast furnace of fractions resulting from steps (1) and (3) and having a particle size higher than said particle size value of about 10–50 μm;

(5) recovery of the fractions having a particle size lower than the particle size value derived from steps (1) and (3) for the recovery of Zn and Pb values contained in these fractions.

The fractions obtained by step (5), which may be called "preconcentrated muds", are particularly suitable as a feed material for the Waelz-Berzelius furnace or for any other pyrometallurgic or hydrometallurgic process since their lead and zinc content is generally higher than 10% by weight.

BRIEF DESCRIPTION OF THE DRAWINGS

The invention will be more clearly understood from the description which follows of preferred embodiments given purely by way of non-limiting example, with reference to the accompanying drawings in which.

DESCRIPTION OF PREFERRED EMBODIMENTS

Figure 1:
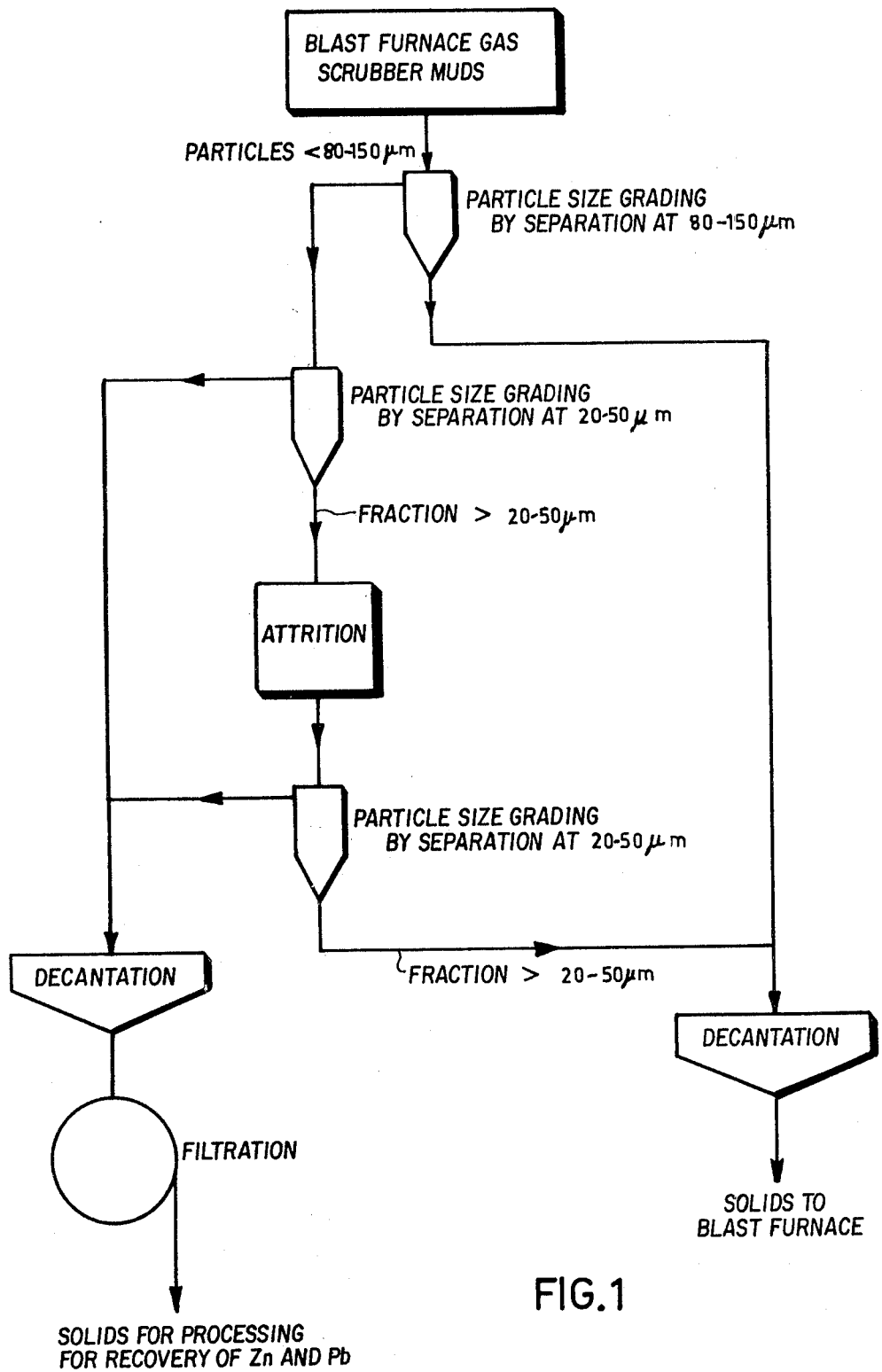
FIG. 1 shows diagrammatically a particularly preferred embodiment of the method according to the invention.

In the present specification, the expression "particle size" value comprised between about 10–50 $\mu m$ signifies that the particle size cutoff is made at a particle size value comprised in this range. This value is determined according to the characteristics of the product to be processed and the device used for the particle size separation.

In a preferred embodiment of the method according to the invention, a treatment by attrition of the mud fractions having a particle size higher than about 20–50 $\mu m$ is carried out, preferably a particle size below about 80–150 $\mu m$, for example a particle size comprised between about 37 and 104 $\mu m$, that is to say a treatment enabling the wearing down of the solid grains by attrition.

This operation can be carried out by the wet route, in grinders with a high attrition action, in attrition cells with or without the addition of a complementary mineral charge, or in any other apparatus designed for this purpose. According to the type of equipment, it will possibly be necessary to adjust the water content of the fraction to be processed to the value corresponding to the maximum efficiency of the system used.

As a complementary mineral charge, it is possible to use sand, for example sand of a particle size comprised between about 210 and 350 $\mu m$, the final concentration of solids (muds+sand) of the pulp having to be comprised between 50 and 80%.

The time of attrition must be sufficient to scour the surface portion of the mud particles by friction and collision of the latter against one another or against the sand particles. Tests have shown that this attrition time must be at least five minutes; this time must be determined according to the degree of recovery desired for the lead and the zinc and the degree of profitability of the method.

The following examples will now illustrate the invention and are of course to be regarded as non-limiting. In these examples, fourteen samples of muds labelled 391 to 395, 401 to 405 and 411 to 414 are used.

These samples were taken from the gas washing water from two Patural (Lorraine) blast furnaces. In the course of the sampling period, the average composition of the agglomerate put in the furnace was as follows: Fe total: 40.5%—$SiO_2$: 13%—CaO: 19%—$Al_2O_3$: 6%—MgO: 2%—Pb: 0.009%—Zn: 0.036%, the amount of coke per 1000 kg of agglomerate being 500 kg.

Total analyses of these batches are given in Table I. They show the means of the analyses carried out by X-ray fluorescence, on three homogeneous samples taken by pulp quartation of each specimen. As can be noted, considerable variations of the lead and zinc contents are observed as a function of time:

|  | Lead Content | Zinc Content |
| --- | --- | --- |
| First Week samples 391 to 395 | 0.7–1.5 | 1.7–3.6 |
| Second week samples 401 to 405 | 1.7–2.2 | 4.3–7.0 |
| Third week samples 411 to 414 | 1.6–2.3 | 4.7–6.4 |

TABLE I

| Sample No. | C | CaO | Fe | $SiO_2$ | $Al_2O_3$ | MgO | $K_2O$ |
| --- | --- | --- | --- | --- | --- | --- | --- |
| P 391 | 20.80 | 17.76 | 21.95 | 10.14 | 4.48 | 1.50 | 0.335 |
| P 392 | 21.10 | 18.60 | 21.45 | 10.73 | 4.60 | 1.53 | 0.225 |
| P 393 | 19.60 | 18.35 | 28.50 | 9.80 | 4.30 | 1.70 | 0.240 |
| P 394 | 23.35 | 16.23 | 21.20 | 10.02 | 4.19 | 1.59 | 0.240 |
| P 395 | 24.10 | 16.08 | 20.45 | 8.96 | 3.91 | 1.52 | 0.240 |
| P 401 | 20.75 | 16.48 | 21.20 | 9.64 | 4.17 | 1.50 | 0.240 |
| P 402 | 23.35 | 15.35 | 20.55 | 9.46 | 4.12 | 1.50 | 0.240 |
| P 403 | 18.60 | 17.36 | 22.25 | 10.05 | 4.28 | 1.56 | 0.250 |
| P 404 | 21.90 | 16.00 | 20.75 | 10.50 | 4.22 | 1.44 | 0.245 |
| P 405 | 22.10 | 15.10 | 19.10 | 9.20 | 3.99 | 1.32 | 0.240 |
| P 411 | 19.40 | 17.04 | 20.15 | 9.41 | 3.97 | 1.46 | 0.255 |
| P 412 | 20.05 | 17.83 | 19.27 | 8.98 | 3.73 | 1.31 | 0.220 |
| P 413 | 17.85 | 20.52 | 18.90 | 8.95 | 3.71 | 1.31 | 0.200 |
| P 414 | 17.70 | 20.10 | 19.50 | 8.90 | 3.92 | 1.20 | 0.195 |

| Sample No. | $Na_2O$ | $TiO_2$ | P | Mn | S | Pb | Zn |
| --- | --- | --- | --- | --- | --- | --- | --- |
| P 391 | 0.190 | 0.175 | 0.584 | 0.223 | 0.74 | 1.54 | 2.83 |
| P 392 | 0.110 | 0.133 | 0.643 | 0.257 | 0.62 | 1.22 | 2.66 |
| P 393 | 0.090 | 0.180 | 0.640 | 0.560 | 0.73 | 0.74 | 2.76 |
| P 394 | 0.100 | 0.164 | 0.555 | 0.210 | 0.55 | 0.85 | 1.89 |
| P 395 | 0.090 | 0.144 | 0.528 | 0.205 | 0.63 | 0.94 | 3.65 |
| P 401 | 0.080 | 0.131 | 0.590 | 0.225 | 0.76 | 2.17 | 4.63 |
| P 402 | 0.090 | 0.128 | 0.558 | 0.204 | 0.76 | 2.03 | 4.37 |
| P 403 | 0.090 | 0.142 | 0.616 | 0.239 | 0.72 | 2.23 | 4.32 |
| P 404 | 0.080 | 0.135 | 0.592 | 0.217 | 0.61 | 1.70 | 4.57 |
| P 405 | 0.090 | 0.127 | 0.519 | 0.190 | 0.72 | 1.94 | 7.01 |
| P 411 | 0.085 | 0.121 | 0.563 | 0.211 | 0.83 | 2.26 | 5.67 |
| P 412 | 0.095 | 0.112 | 0.561 | 0.213 | 0.75 | 2.03 | 4.98 |
| P 413 | 0.095 | 0.109 | 0.584 | 0.236 | 0.69 | 1.56 | 4.68 |
| P 414 | 0.090 | 0.117 | 0.550 | 0.230 | 0.77 | 1.63 | 6.40 |

EXAMPLE 1

Particle size grading by sifting blast furnace gas scrubber muds

A sifting was carried out by the wet route of the samples described above by means of a "Sinex" vibrator and sieves of the following meshes: 500 microns, 250 microns and 104 microns. Wet sifting was then carried out on a portion of the fraction below 104 microns, at 63 microns and 37 microns. The other portion of the fraction below 104 microns was processed by cycloning (see Example 2).

Each particle size fraction was dried in the oven at 105° C., weighed then sampled by dry quartation. This was done by means of ore and metal samplers after grinding the specimen taken. Chemical analysis of the Pb and of the Zn were done on the following particle size cuts: +250; 104–250; 63–104; 37–63; 10–104 microns. On the fraction 0–37 microns total analyses of C, CaO, Fe, $SiO_2$, $Al_2O_3$, MgO, $K_2O$, $Na_2O$, P, Mn, S, Pb, Zn were carried out.

From the parameters measured calculations were made of:
the weight distribution,
the recoveries of Pb and Zn in the various particle size fractions.

In Table II below, the result of the analyses carried out on the fraction 0–37 μm is indicated.

TABLE II

Chemical analyses of the fraction <37 microns of the various samples

| Sample No. | C | CaO | Fe | $SiO_2$ | $Al_2O_3$ | MgO | $K_2O$ |
|---|---|---|---|---|---|---|---|
| P 391 | 18.15 | 19.08 | 17.54 | 7.54 | 3.48 | 1.42 | 0.205 |
| P 392 | 15.40 | 19.20 | 19.40 | 8.50 | 3.80 | 1.15 | 0.230 |
| P 393 | 20.60 | 18.44 | 17.39 | 7.61 | 3.44 | 1.27 | 0.200 |
| P 394 | 18.90 | 19.63 | 18.66 | 7.94 | 3.73 | 1.38 | 0.185 |
| P 395 | 17.90 | 19.62 | 18.75 | 9.17 | 4.55 | 1.54 | 0.190 |
| P 401 | 15.90 | 15.93 | 16.90 | 7.56 | 3.23 | 1.23 | 0.205 |
| P 402 | 15.20 | 16.82 | 17.95 | 7.32 | 3.33 | 1.20 | 0.205 |
| P 403 | 16.60 | 17.97 | 16.75 | 7.42 | 3.35 | 1.22 | 0.195 |
| P 404 | 16.10 | 17.07 | 15.10 | 7.11 | 3.09 | 1.16 | 0.195 |
| P 405 | 14.30 | 13.85 | 14.30 | 6.52 | 2.85 | 1.20 | 0.165 |
| P 411 | 14.85 | 16.99 | 14.50 | 6.84 | 2.96 | 1.18 | 0.185 |
| P 412 | 14.50 | 17.80 | 13.50 | 6.76 | 2.83 | 1.07 | 0.175 |
| P 413 | 13.60 | 21.12 | 13.50 | 6.61 | 2.86 | 1.05 | 0.160 |
| P 414 | 13.45 | 18.90 | 12.90 | 6.40 | 2.80 | 0.90 | 0.145 |

| Sample No. | $Na_2O$ | $TiO_2$ | P | Mn | S | Pb | Zn |
|---|---|---|---|---|---|---|---|
| P 391 | 0.100 | 0.152 | 0.557 | 0.184 | 1.22 | 4.13 | 6.04 |
| P 392 | 0.090 | 0.100 | 0.650 | 0.220 | 0.90 | 1.45 | 3.10 |
| P 393 | 0.909 | 0.146 | 0.529 | 0.172 | 0.95 | 2.10 | 5.65 |
| P 394 | 0.090 | 0.152 | 0.539 | 0.186 | 0.84 | 2.60 | 4.10 |
| P 395 | 0.070 | 0.165 | 0.631 | 0.186 | 1.15 | 2.80 | 7.64 |
| P 401 | 0.075 | 0.089 | 0.528 | 0.177 | 1.42 | 5.03 | 9.36 |
| P 402 | 0.070 | 0.099 | 0.510 | 0.180 | 1.27 | 4.50 | 8.50 |
| P 403 | 0.060 | 0.095 | 0.537 | 0.187 | 1.27 | 4.90 | 8.55 |
| P 404 | 0.060 | 0.089 | 0.507 | 0.170 | 1.20 | 4.40 | 11.30 |
| P 405 | 0.060 | 0.081 | 0.436 | 0.163 | 1.07 | 4.40 | 16.00 |
| P 411 | 0.060 | 0.079 | 0.470 | 0.166 | 1.36 | 4.98 | 12.26 |
| P 412 | 0.070 | 0.070 | 0.476 | 0.165 | 1.47 | 5.50 | 12.55 |
| P 413 | 0.070 | 0.056 | 0.506 | 0.185 | 1.16 | 3.79 | 10.35 |
| P 414 | 0.065 | 0.060 | 0.460 | 0.180 | 1.40 | 4.15 | 15.50 |

Figure 2:
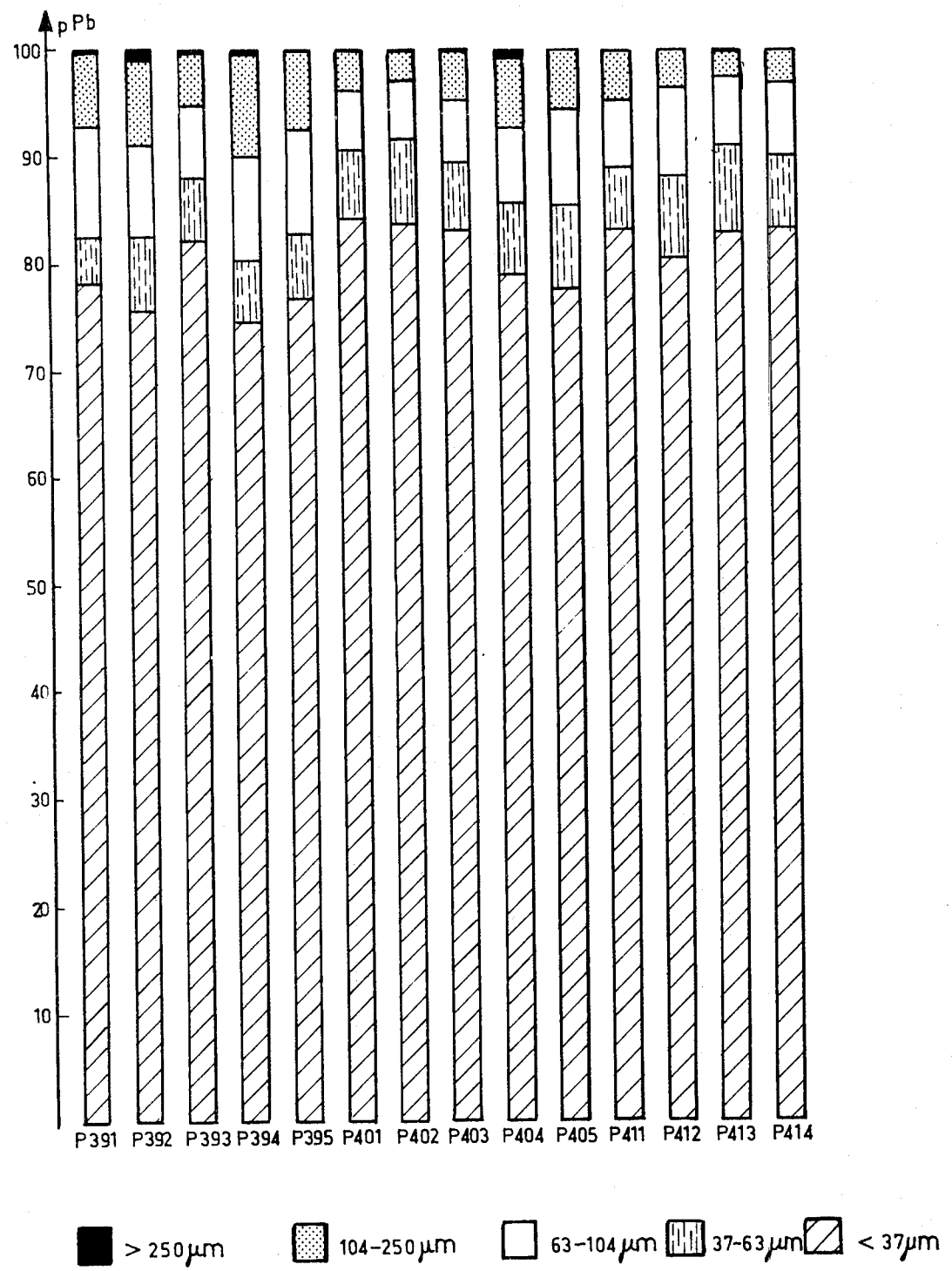
FIGS. 2 and 3 show diagrams in which the results of examples of the application of the process according to the invention are indicated.
Figure 3:
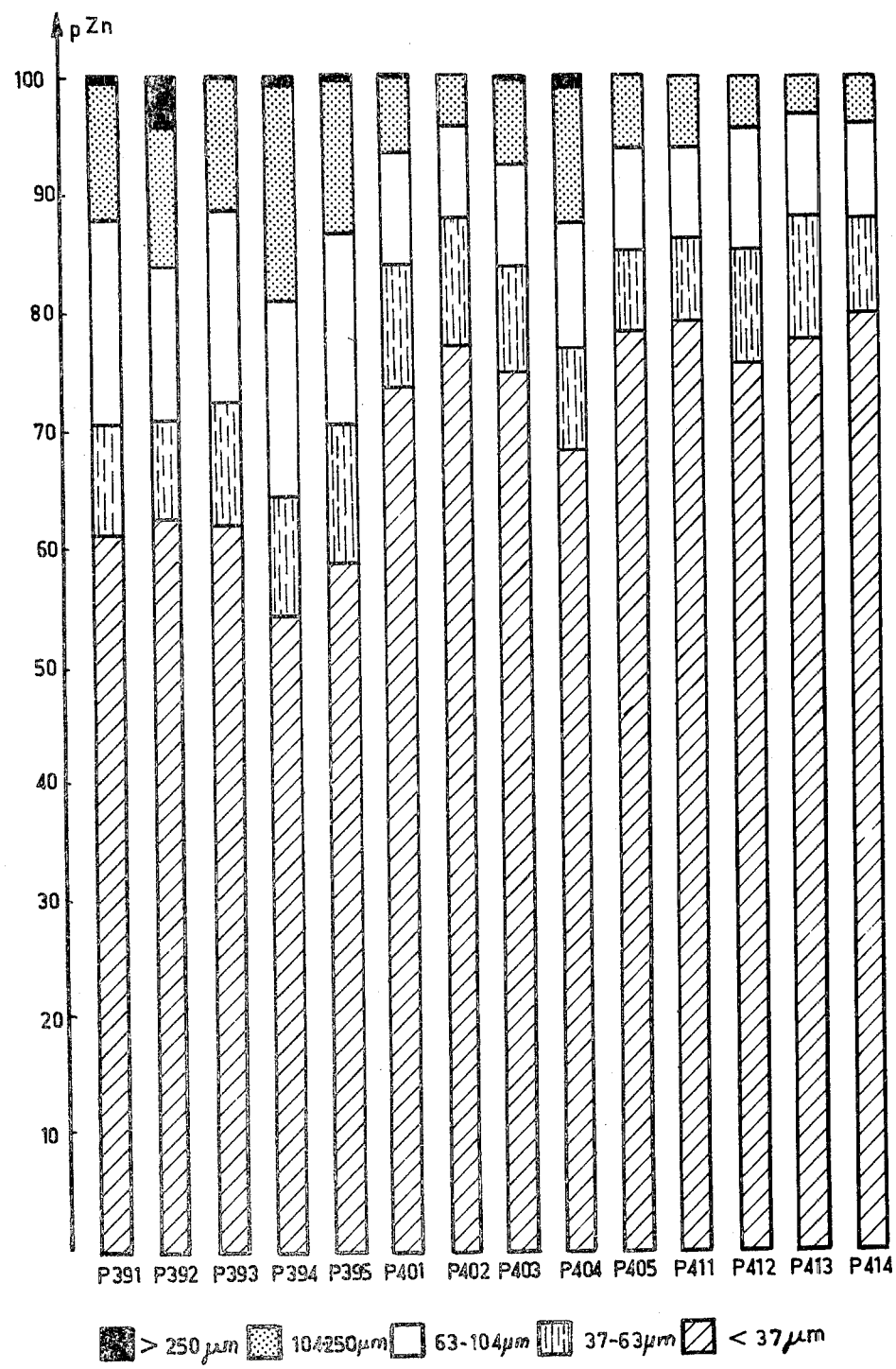
Figure 4:
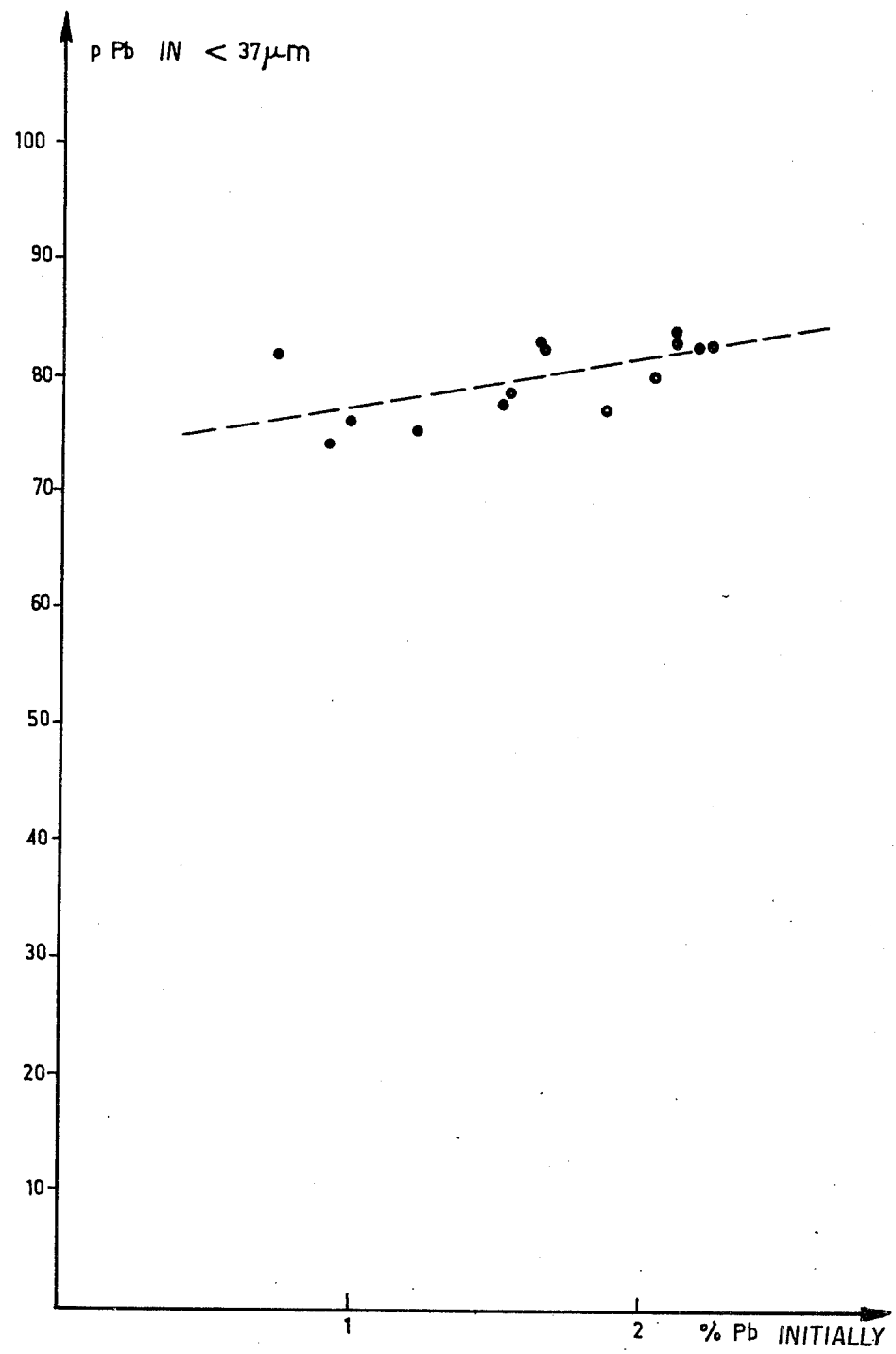
FIG. 4 shows a graph of the proportion of recovery of the lead in said examples as a function of the initial lead content.
Figure 5:
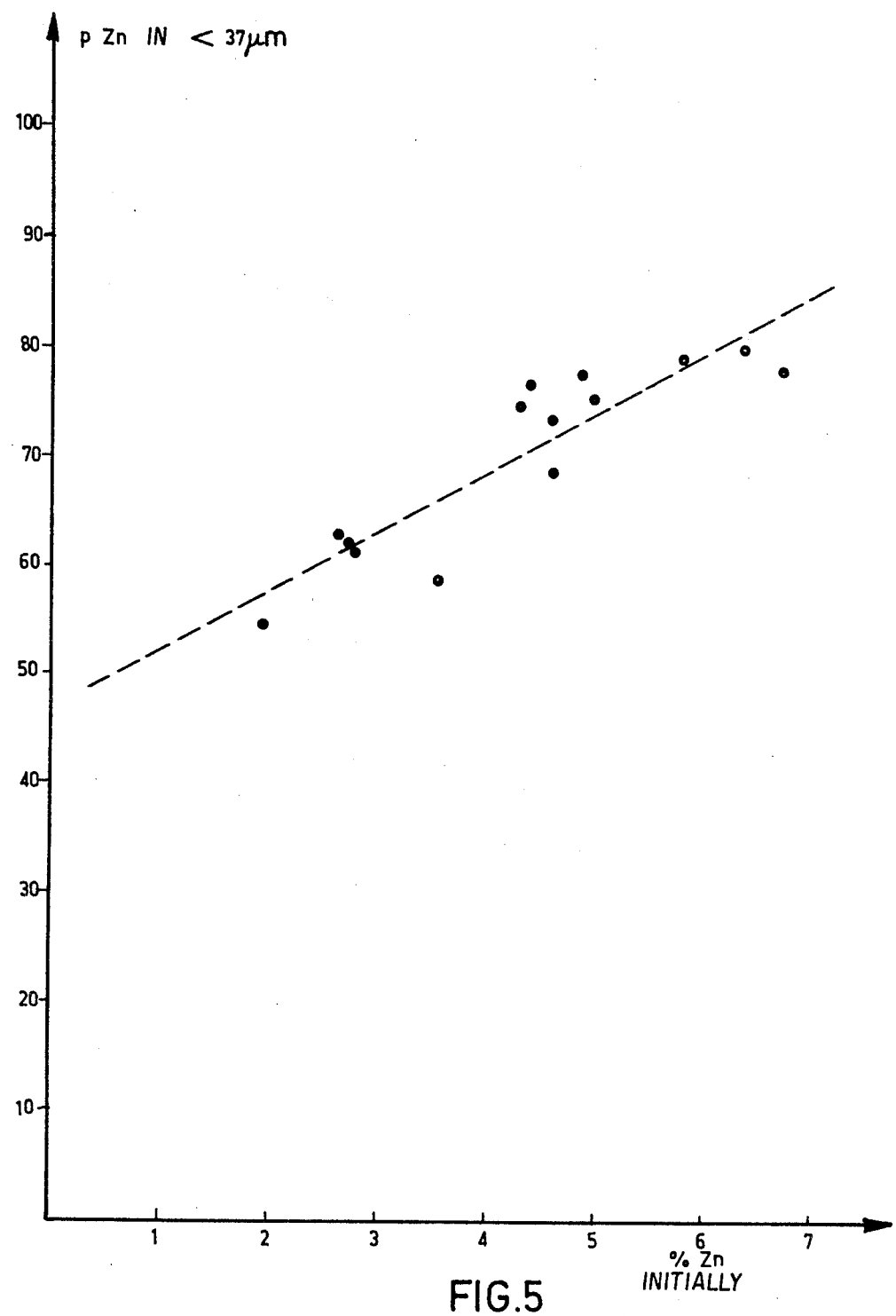
FIG. 5 shows a graph of the proportion of the recovery of zinc according to the initial content of zinc.

In order to establish the efficiency of the method of the invention, there was also determined, as indicated previously, the lead content and zinc content of the particle size fractions above 37 μm, and the results are plotted in the diagrams of FIGS. 2 and 3 in which are indicated, as ordinates, the recovery of lead and of zinc respectively in each particle size fraction, and as abscissae, the sample concerned. It is observed, from FIGS. 2 and 3, that:

the recovery level of the lead in the cut 0–37 microns is always close to 80±5 (FIG. 2) and that it increases slightly as a function of the lead content of the total intake as is established by the curve of FIG. 4 which shows the recovery of the Pb in the fraction 0–37 μm as a function of the initial lead content; in this figure, there are plotted as ordinates the recovery of lead in the fraction 0–37 μm and, as abscissae, the initial lead content;

the recovery level of the zinc is in the vicinity of 60 for the samples taken in the first week, then stabilizes around 75 (FIG. 3). There exists an almost linear relationship between the increase in the recovery rate and the increase of the zinc content of the overall intake (correlation coefficient: 0.873, confidence limits: 0.99999 (FIG. 5)).

Figure 6:
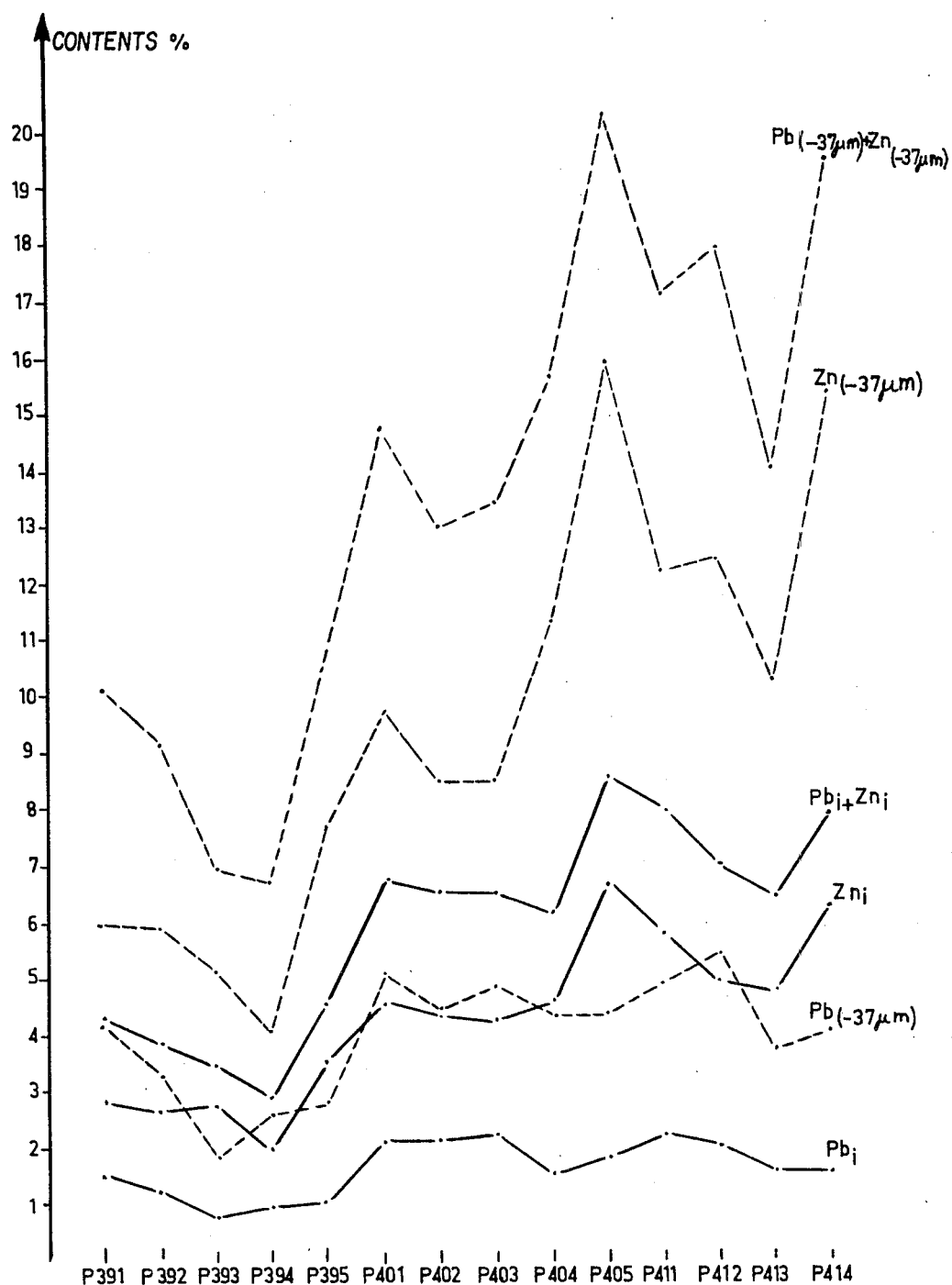
FIG. 6 shows graphs of the contents as percentage of the lead, zinc and lead + zinc of the various samples which are identified as abscissae.

The Pb+Zn contents in the fraction having a particle size less than 37 microns vary from 7 to 20% and depend on the contents of the overall intake as is clearly established by FIG. 6 which is a diagram showing the development of the contents of Pb, Zn and Zn+Pb in the various samples and the particle size fractions less than 37 μm; in FIG. 6, are plotted as ordinates the contents in percentage of Pb, Zn and Pb+Zn of the various samples which are indicated as abscissae.

When the overall intake contains less than 4.5% of Pb+Zn (samples P 391 to P 396), the contents in the particle size cut 0–37 microns are comprised between 7 and 10% and the recovery rates of zinc close to 60. If it contains between 4.5 and 8.5% of Pb+Zn, the contents in the concentrate are comprised between 13 and 20%, the recovery rates of the zinc being close to 75. It is therefore observed a tendency of these metals to concentrate in the fines when their content in the overall intake increases.

EXAMPLE 2

Particle size grading by sifting and cycloning

The second part of the fraction with particle size less than 104 microns obtained in Example 1 is subjected to cycloning. The cycloning is carried out by means of a Minemet laboratory hydrocyclone at a supply pressure of 1 kg/cm² and with an adjustment of the internal pressure by reduction of the flow rate at the overflow adjusted so that the underflow occurs under optimum conditions of the umbrella of parabolic flow (nozzle diameter: 1.5 mm). The effectiveness of cycloning is controlled by samplings with the pipette, during rapid stirring, of the supply (less than 104 microns) of the underflow (10–104 microns) and of the overflow (less than 10 microns). These samplings underwent a complete particle size analysis in the zone 2–100 microns by means of "Sedigraph 5000," the analyses being carried out repeatedly with an increasing addition of dispersing agent (Dispex N40-Betz) until a maximum dispersion is obtained in order to know the effectiveness of the cycloning. Individual cycloning tests with the dispersing agent were also made.

A—Tests without dispersing agent

The tests were carried out in order to obtain a cut at 10 microns. For each test, the effectiveness of the cycloning was characterized by means of the usual formula:

$$E = 10,000 \cdot \frac{P}{Aa} \cdot \frac{p - a}{100 - a}$$

where A, P are the weights of the supply and of the overflow, a and p the respective proportions, expressed in percent, of the weights, of the grains of particle size less than 10 microns of the supply and of the overflow. This formula gives the ratio expressed in percent, of the graded product of the overflow to the gradeable product Aa/100 of the supply. The table below summarizes the results obtained.

| Samples | P391 | P392 | P393 | P394 | P395 | P401 | P402 |
|---|---|---|---|---|---|---|---|
| Efficiency of cycloning | 60.50 | 53.25 | 50.56 | 64.27 | 58.37 | 60.60 | 55.50 |

| Samples | P403 | P404 | P405 | P411 | P412 | P413 | P414 |
|---|---|---|---|---|---|---|---|
| Efficiency of cycloning | 52.50 | 53.00 | 48.40 | 57.60 | 51.83 | 55.70 | 50.80 |

These tests are acceptable to the extent that the formula used gives generally values of E comprised between 60 and 40%.

Figure 7:
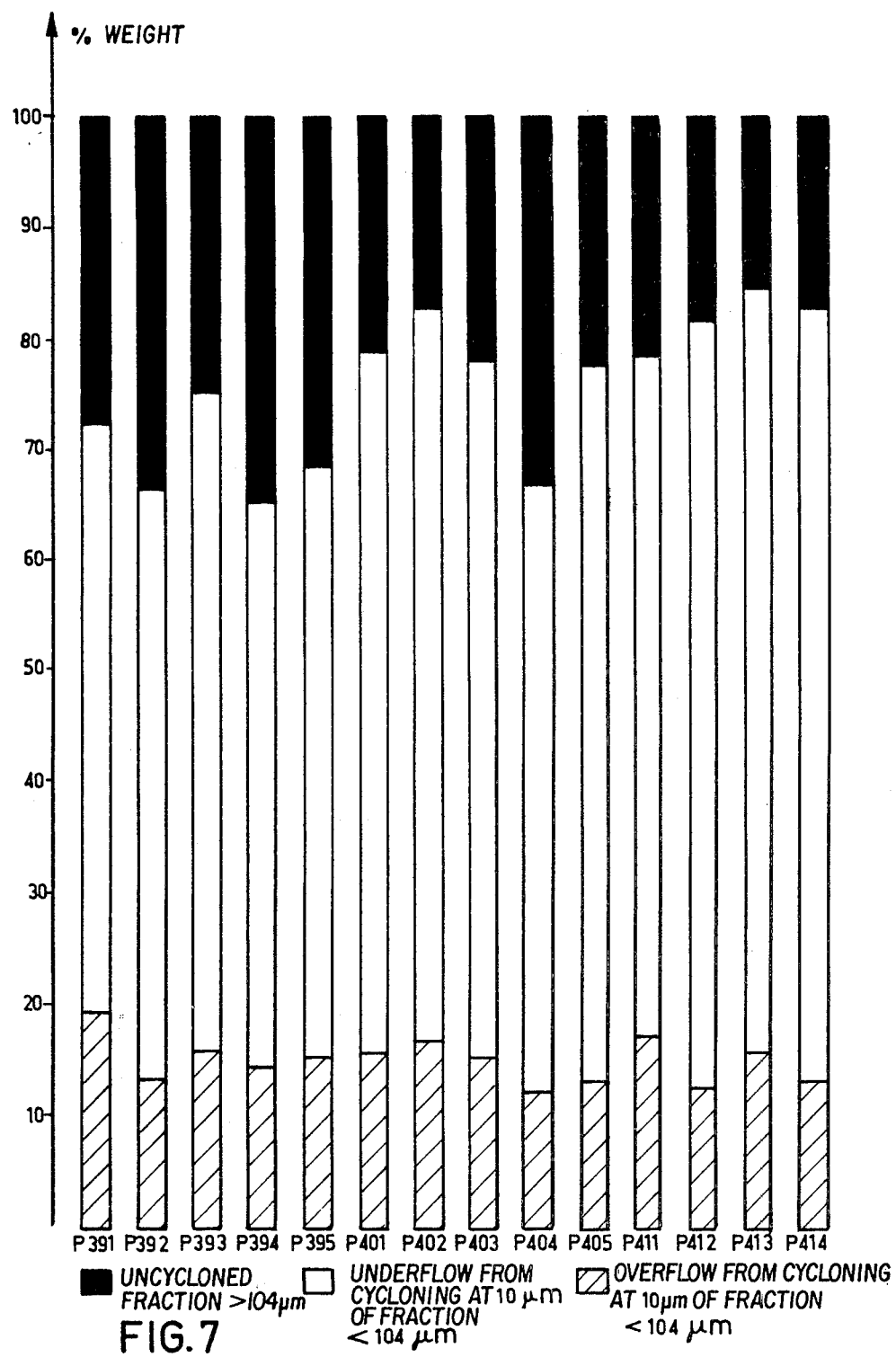
FIG. 7 shows the results obtained in another embodiment of the application of the process according to the invention, showing the weight distribution of the particle size classes obtained by cycloning.
Figure 8:
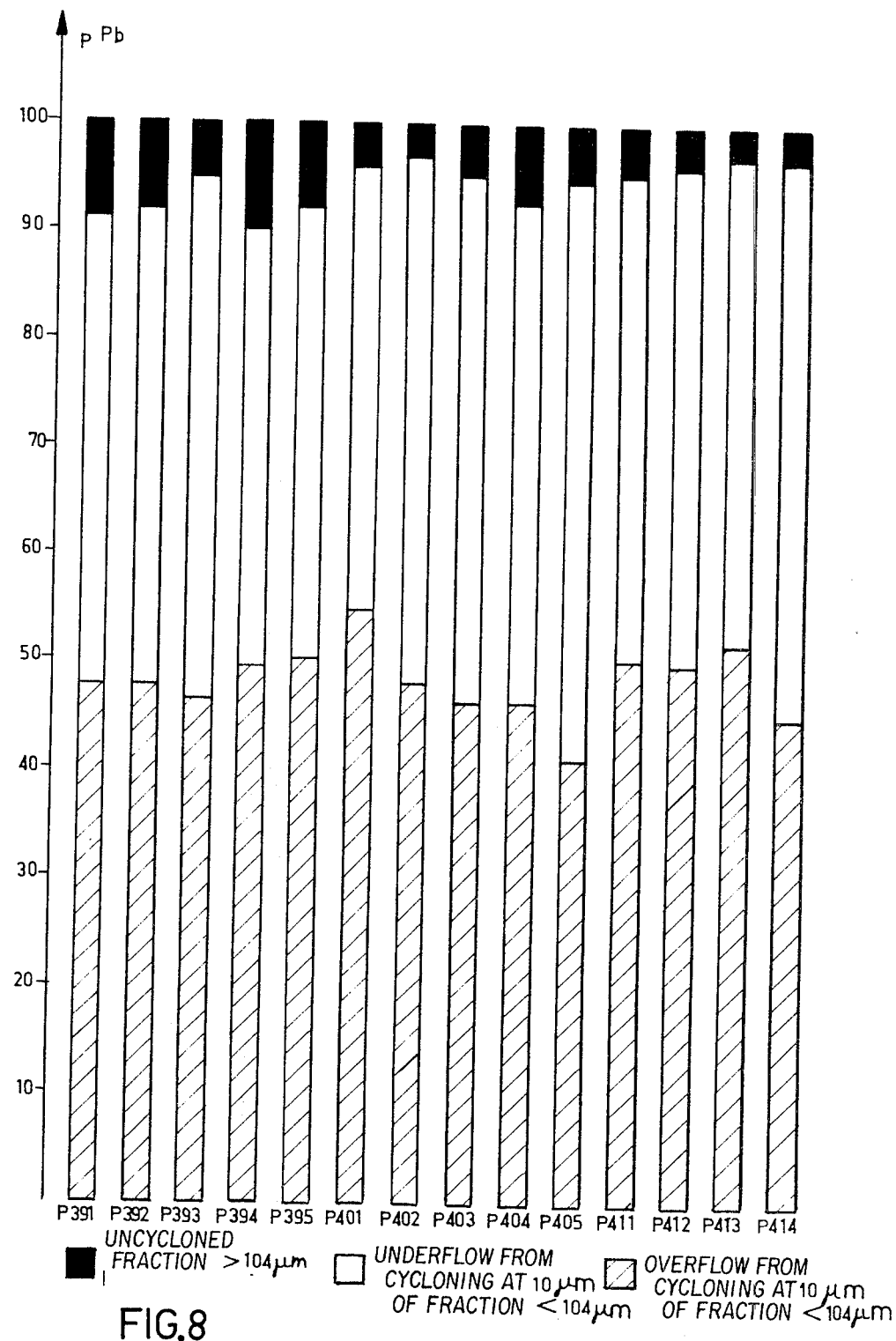
FIGS. 8 and 9 are diagrams indicating respectively the recovery of the lead and of the zinc in various particle size cuts obtained by cycloning.
Figure 9:
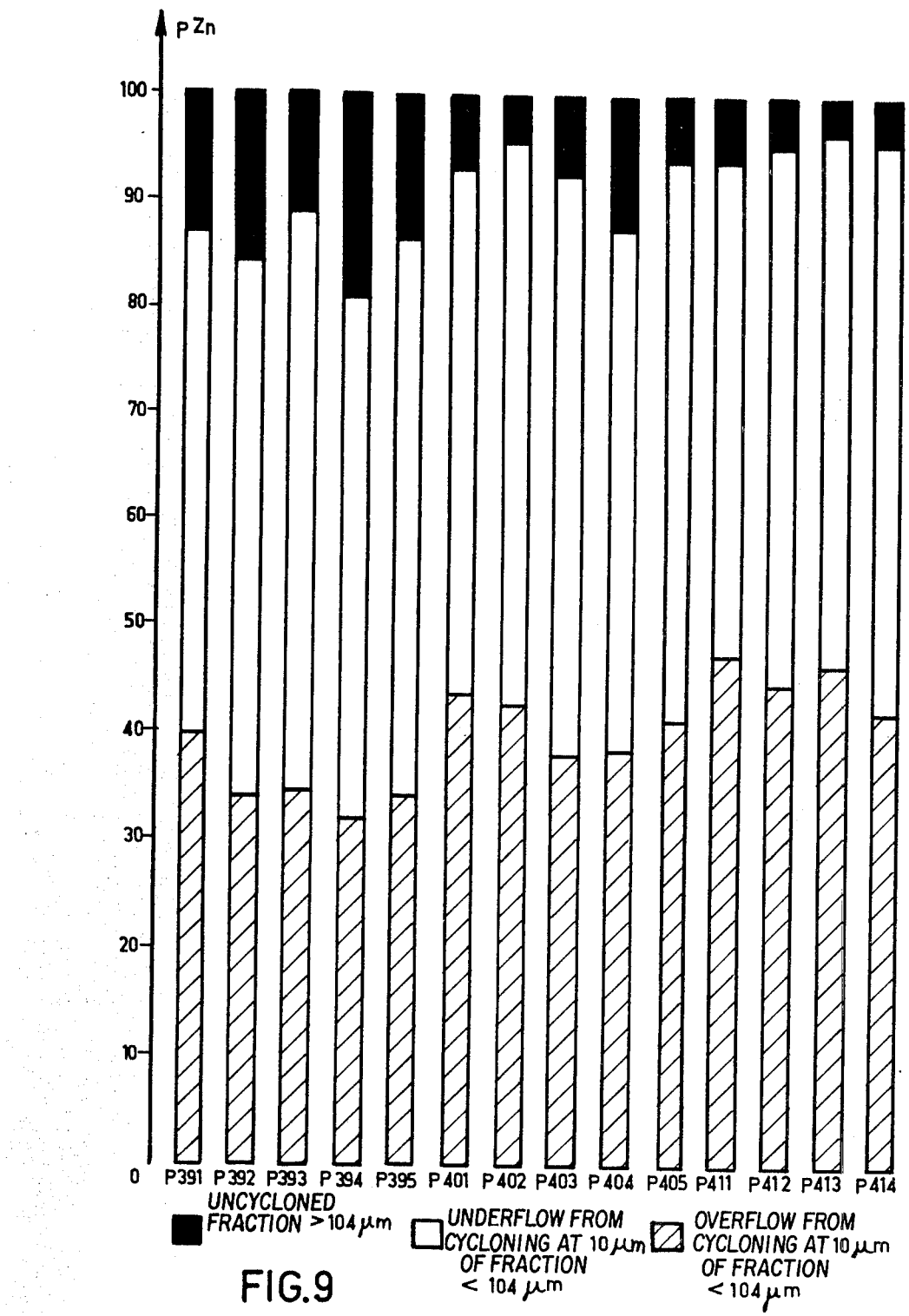
Figure 10:
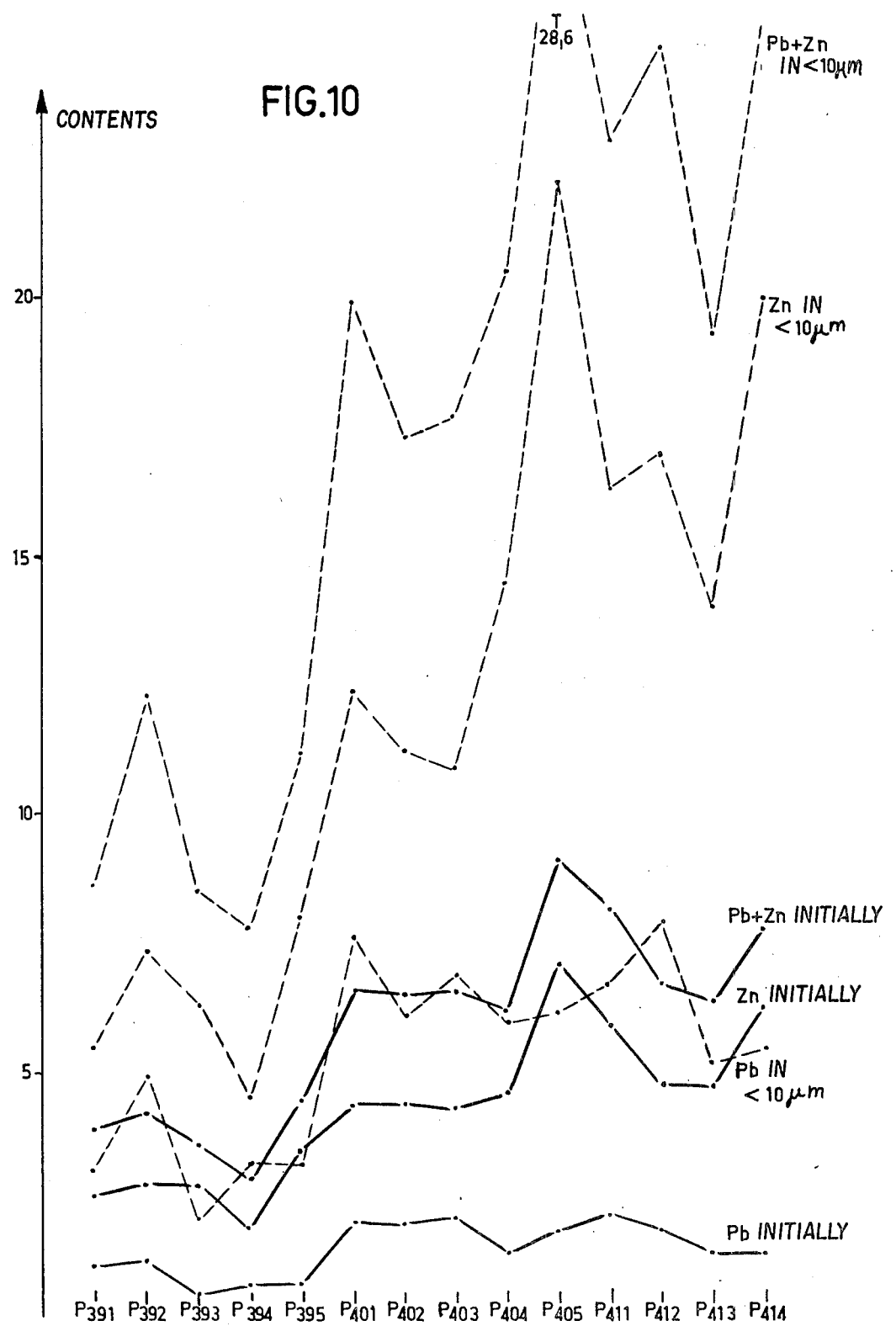
FIG. 10 is a series of curves illustrating the development of the contents of Pb, Zn and Pb+Zn in the various samples.
Figure 11:
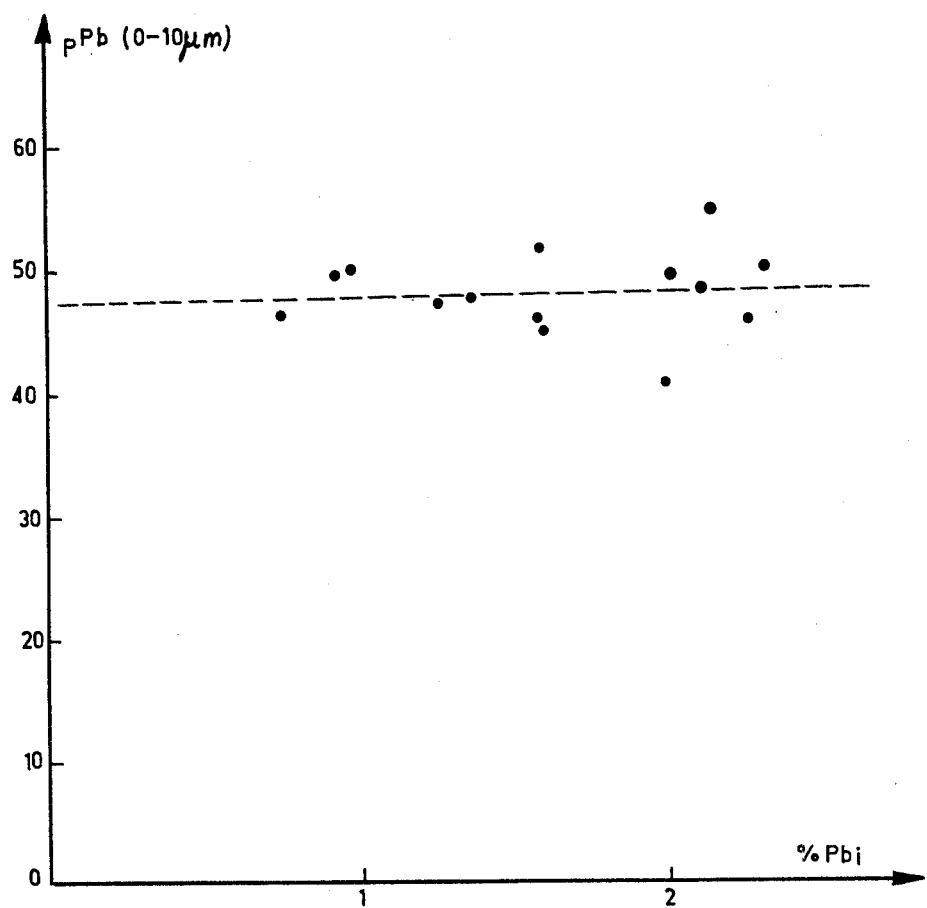
FIGS. 11 and 12 show respectively the recovery levels of Pb and of Zn in the fraction 0–10 microns according to their respective initial content of Pb and of Zn.
Figure 12:
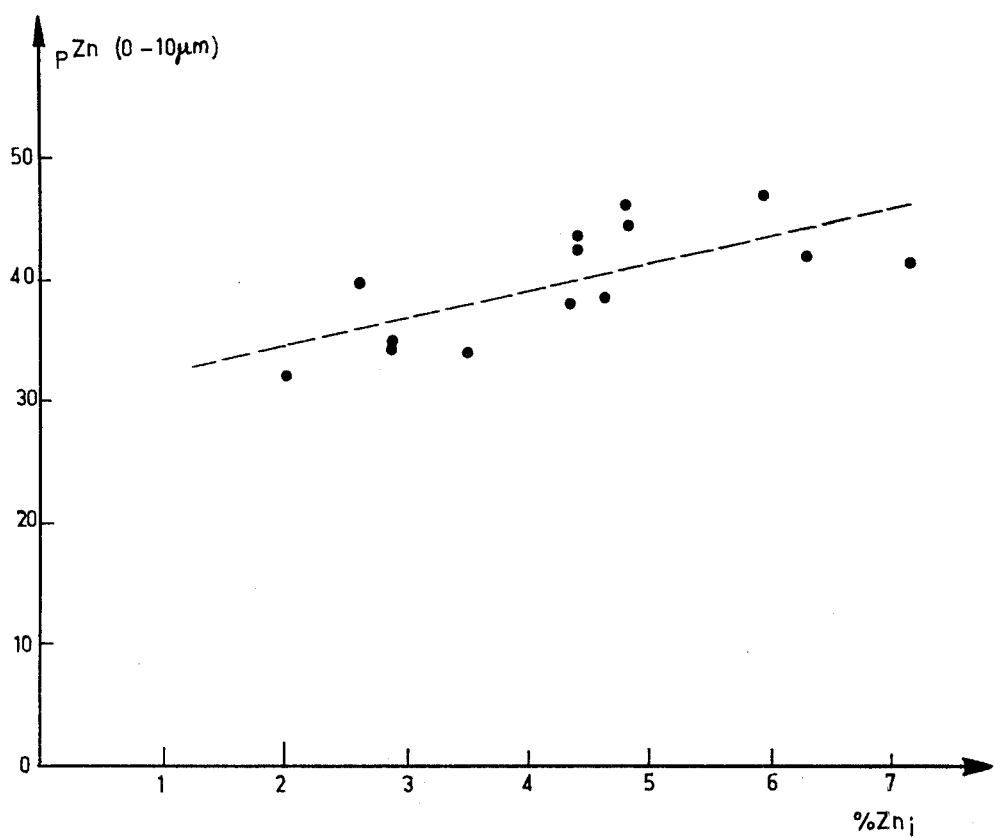

The principal results obtained are as follows:

the weight percentages of the particle size cut 0–10 microns are comprised between 12 and 19% (FIG. 7).

the recovery levels of the lead of the overflow is still in the vicinity of 50%, with the exception of the sample P405 whose cycloning efficiency was average: 48.4% (FIG. 8).

the recovery level of the lead of the overflow is independent of the initial lead content of the overall intake (FIG. 11).

the recovery level of the zinc is in the vicinity of 35% for the poor overall samples and 45% for the richer samples (FIGS. 9 and 12).

the contents of Pb+Zn are comprised between 8 and 28.6% in the products of the overflow (FIG. 10).

the comparison of the particle size curves of the feed of the overflow and of the underflow show that about 25% by weight of the particle size cut 0–10 microns is contained in the underflow, which explains in part the low metal recovery rate of the zinc. The cycloning may be improved by re-cycloning one or more times the underflows.

FIG. 7 is a diagram showing the weight distribution of the particle size classes obtained by cycloning for each sample which is indicated as abscissae, whereas the weight percentage is plotted as ordinates.

FIGS. 8 and 9 are diagrams indicating respectively the recovery of the lead and of the zinc in the various particle size cuts obtained by cycloning. The recovery of Pb and Zn is indicated as ordinates.

FIG. 10 is a series of curves showing the development of the Pb, Zn and Pb+Zn contents in the various samples and in the corresponding overflow of the cycloning at 10 microns of the fraction below 104 microns. The contents are indicated as ordinates and the samples as abscissae.

FIGS. 11 and 12 show respectively the recovery levels of lead and of zinc in the fraction 0–10 microns as a function of the respective initial content of Pb and Zn. In these figures, the initial % of Pb or Zn are indicated as abscissae whereas the recoveries of Pb or Zn in the fraction 0–10 microns are plotted as ordinates.

Table III gives the overall chemical analyses of products of the overflow (≃0–10 microns) of each sample.

TABLE III

Analyses of the overflow of the cycloning at 10 microns of the fraction 0–104 microns of the various samples

| Sample No. | C | CaO | Fe | SiO$_2$ | Al$_2$O$_3$ | MgO | K$_2$O |
|---|---|---|---|---|---|---|---|
| P 391 | 20.95 | 18.58 | 11.42 | 5.84 | 2.93 | 1.27 | 0.190 |
| P 392 | 18.10 | 18.50 | 15.40 | 8.00 | 3.45 | 1.00 | 0.190 |
| P 393 | 22.70 | 18.50 | 19.50 | 7.30 | 3.22 | 1.55 | 0.185 |
| P 394 | 21.20 | 19.94 | 16.09 | 7.65 | 3.42 | 1.41 | 0.160 |

TABLE III-continued

Analyses of the overflow of the cycloning at 10 microns of the fraction 0–104 microns of the various samples

| | | | | | | | |
|---|---|---|---|---|---|---|---|
| P 395 | 20.55 | 18.93 | 14.75 | 7.27 | 3.35 | 1.36 | 0.200 |
| P 401 | 19.50 | 14.76 | 11.65 | 6.41 | 2.82 | 0.93 | 0.195 |
| P 402 | 18.10 | 15.96 | 12.25 | 6.04 | 2.62 | 1.01 | 0.180 |
| P 403 | 19.80 | 16.78 | 11.50 | 5.95 | 2.73 | 0.97 | 0.185 |
| P 404 | 18.40 | 15.72 | 10.00 | 6.16 | 2.57 | 0.88 | 0.175 |
| P 405 | 15.70 | 11.80 | 8.95 | 5.50 | 2.26 | 0.85 | 0.140 |
| P 411 | 16.60 | 15.05 | 9.25 | 5.67 | 2.36 | 1.23 | 0.150 |
| P 412 | 16.40 | 15.86 | 7.60 | 5.69 | 2.26 | 0.85 | 0.160 |
| P 413 | 16.00 | 19.74 | 9.00 | 5.51 | 2.31 | 0.91 | 0.140 |
| P 414 | 15.50 | 15.60 | 6.90 | 4.90 | 2.05 | 0.80 | 0.125 |

| Sample No. | Na$_2$O | TiO$_2$ | P | Mn | S | Pb | Zn |
|---|---|---|---|---|---|---|---|
| P 391 | 0.105 | 0.114 | 0.432 | 0.133 | 1.83 | 6.43 | 8.28 |
| P 392 | 0.075 | 0.090 | 0.630 | 0.220 | 1.09 | 4.95 | 7.35 |
| P 393 | 0.080 | 0.100 | 0.500 | 0.800 | 1.26 | 2.38 | 6.02 |
| P 394 | 0.085 | 0.138 | 0.510 | 0.158 | 0.98 | 3.25 | 4.55 |
| P 395 | 0.070 | 0.138 | 0.464 | 0.144 | 1.31 | 3.24 | 8.00 |
| P 401 | 0.080 | 0.068 | 0.448 | 0.141 | 2.07 | 6.56 | 11.25 |
| P 402 | 0.070 | 0.068 | 0.415 | 0.131 | 1.88 | 6.10 | 11.30 |
| P 403 | 0.070 | 0.060 | 0.454 | 0.141 | 1.83 | 6.90 | 10.95 |
| P 404 | 0.060 | 0.056 | 0.429 | 0.134 | 1.60 | 6.00 | 14.65 |
| P 405 | 0.060 | 0.062 | 0.350 | 0.131 | 1.40 | 6.20 | 22.40 |
| P 411 | 0.050 | 0.056 | 0.363 | 0.134 | 1.73 | 6.82 | 16.41 |
| P 412 | 0.085 | 0.033 | 0.369 | 0.126 | 2.03 | 7.95 | 17.10 |
| P 413 | 0.060 | 0.030 | 0.428 | 0.165 | 1.69 | 5.27 | 14.15 |
| P 414 | 0.065 | 0.020 | 0.360 | 0.120 | 1.88 | 5.55 | 20.15 |

B—Tests with dispersing agent

Tests have been carried out using increasing doses of dispersing agent (Dispex) in the feed for cycloning particle size cuts 0–104 and 0–37 microns for obtaining a product smaller than 10 microns. The results obtained are displayed in the table below. According to these results, the influence of the dispersing agent seems nil or slightly negative on the recovery rate of the lead and of the zinc.

| Particle size cut | Consumption of dispersing agent | Pb Recovery | | Zn Recovery | |
|---|---|---|---|---|---|
| | | With | Without | With | Without |
| 0–104 microns | 1.1 kg/t | 44.0 | 47.6 | 34.9 | 40.0 |
| 0–37 microns | 2.0 kg/t | 56.0 | 56.3 | 40.0 | 41.1 |

EXAMPLE 3

Particle size grading by sifting and cycloning with flocculating agent

In order to test the effectiveness of cyclone separation on products previously flocculated in decanters, tests have been carried out by preflocculating the particle size cut 0–104 microns before the cycloning operations. The flocculating agent used was the reactant AS 11 (strongly anionic copolymer of acrylamide currently used in industry for the flocculation of muds) at the concentration of 250 g/t. The table below summarizes the results obtained on the sample 402.

| Pb recovery rate in the overflow | | Zn recovery rate in the overflow | |
|---|---|---|---|
| With | Without | With | Without |
| 48.9 | 48.3 | 41.1 | 42.6 |

As can be observed, cycloning can be done with a cut at 10 microns, even on preflocculated products. This is an important result to the extent that the adoption of preconcentration by cycloning at 37 or 10 microns, in existing plants using flocculation for recovery of the muds, would not pose any problem. The shearing forces in the cyclone are much greater than the forces that ensure cohesion of the flocks.

EXAMPLE 4

Particle size grading and treatment by attrition

Tests were carried out on particle size cuts 37-104 microns of the samples 411 and 413 in special "Agitair" cells. The attrition consists of scouring the surface portion of the particles by friction and collision of the latter against one another or against harder particles added to the pulp.

Fontainebleau sand was used, calibrated by sifting between 210 and 350 microns. The stirring speed was at 1000 rpm. The characteristics of the products were as follows:

| | % weight with respect to total intake | Pb % | Zn % |
|---|---|---|---|
| 411 | 41.4 | 0.67 | 2.08 |
| 413 | 48.8 | 0.51 | 1.92 |

A—Influence of attrition time

Test conditions: 25% solid; 25% sand; 50% water

The table below presents the results obtained, that is to say the development of the content and of the recovery level in the fraction 0-37 microns obtained by sifting of the pulp at the end of the operation.

| | Lead % (initial content: 0.67) | | Zinc % (initial content: 2.08) | |
|---|---|---|---|---|
| | Content | Recovery | Content | Recovery |
| 5 min | 1.28 | 26.4 | 4.09 | 28.3 |
| 10 min | 1.33 | 37.2 | 4.02 | 37.8 |
| 15 min | 1.36 | 40.5 | 4.20 | 41.1 |
| 25 min | 1.44 | 48.5 | 4.08 | 47.4 |

It is observed that at the end of 5 min the contents have doubled with respect to the content of the initial particle size cut concerned. The recovery levels being in the vicinity of 27%, it is possible to consider that this relates to zinc and lead concentrated at the surface of the ores of the gangue. Then, the contents are stabilized with a regular increase in the recovery levels as a function of time due to attrition of the constituents of the mud. It seems therefore that 73% of the lead and of the zinc contained in the cut 37-104 microns are intimately bound to the ore.

B—Influence of the proportion of sand (stirring time 10 min)

The results recorded below show a regular increase in the recovery level, by self-grinding, of the constituents as a function of the proportion of sand used, after releasing of the lead and the zinc contained in the surface phases of the ores.

| | | Pb | | Zn | |
|---|---|---|---|---|---|
| | | Content | Recovery | Content | Recovery |
| 411 | 35% muds 15% sand | 1.44 | 20.5 | 4.63 | 22.6 |
| | 25% muds 25% sand | 1.33 | 37.2 | 4.02 | 37.8 |
| | 15% muds 35% sand | 1.41 | 37.8 | 4.22 | 38.5 |
| 413 | 50% muds 0% sand | 0.99 | 6.05 | 4.66 | 7.6 |
| | 40% muds 10% sand | 1.08 | 10.6 | 4.5 | 11.8 |
| | 30% muds 20% sand | 1.09 | 22.9 | 4.1 | 22.6 |
| | 20% muds 30% sand | 1.10 | 36.4 | 3.9 | 34.0 |
| | 10% muds 40% sand | 1.00 | 48.7 | 3.6 | 45.3 |

Taking these results into account, attrition can be considered when it is desired to obtain higher recovery levels at the expense of the content of preconcentrates.

EXAMPLE 5

There was treated, according to the preferred embodiment of the invention, a scrubber mud from blast furnace gases obtained after natural decantation without the addition of flocculating agent. This mud was constituted from water and solid matter, the analysis of which after drying gave:

| CaO = 20.52% | Fe = 18.90% | C = 17.85% |
|---|---|---|
| $SiO_2$ = 8.95% | $Al_2O_3$ = 3.71% | Zn = 4.86% |
| | | Pb = 1.67% |

There are reported the weights on processing a quantity of mud containing 100 kg of solid matter.

(1) The first operation of particle size separation was carried out by wet sifting at 106 μm and enabled the separation of a fraction constituted by particles larger than 106 μm including 15 kg of solid matter whose analysis indicated contents of 0.28% of Pb and 1.06% of Zn.

(2) The fraction which contained the particles of a size smaller than 106 μm underwent a second particle size searation operation by sifting at 37 μm.

This operation enabled the isolation of a fraction with fine particles of sizes smaller than 37 μm containing 37 kg of solid matter whose contents were 3.79% of Pb and 10.35% of Zn.

(3) The intermediate fraction, which contained a majority of solid particles of sizes comprised between 37 and 106 μm, representing a weight of 48 kg of matter, was processed in an attrition cell for a period of 10 minutes.

(4) At the end of this operation, the mixture underwent a particle size separation by sifting at 37 μm. The fine particle fraction contained 7.3 kg of solid matter assaying 1.10% Pb and 3.88% Zn. The fraction of parallel size larger than 37 μm contained 40.7 kg of solid matter whose contents were Pb=0.37% and Zn=1.45%.

The treatment hence enabled separation of the solid matter constituting the initial mud into two parts:

a first part comprising the 15 kg of matter of particle size larger than 106 μm obtained in the course of operation (1) and the 40.7 kg of matter of particle size comprised between 37 and 106 μm obtained in the course of the operation (4). This first part hence represented 55.7 kg of matter whose contents were 0.35% of Pb and 1.34% of Zn. It could be recycled to the blast furnace supply.

a second part comprising the 37 kg of matter of particle size smaller than 37 μm obtained in the course of the operation (2) and the 7.3 kg of material of particle size also smaller than 37 μm obtained in the course of the operation (4). This second part hence represented 44.3 kg of matter whose contents were 3.35% of Pb and 9.28% of Zn. It contained 88% of the Pb and 85% of the Zn initially contained in the mud to be processed. This second part could be processed under satisfactory economic conditions, by a chemical recovery process for the lead and the zinc.

We claim:

1. A process for recovering lead and zinc values from blast furnace scrubber mud which comprises:
   (a) separating from said mud a fraction having a particle size greater than about 10 to 50 μm;
   (b) scouring by attrition said fraction having a particle size greater than about 10 to 50 μm to separate lead and zinc values from said fraction;
   (c) separating the particles from steps (a) and (b) having a size less than about 10 to 50 μm for recovery of the lead and zinc values contained therein; and
   (d) recycling to the feed of the blast furnace the fractions from steps (a) and (b) having a particle size greater than about 10 to 50 μm.

2. The process of claim 1, wherein the fraction separated in step (a) has a particle size greater than 50 μm.

3. The process of claim 1, wherein the scouring by attrition is carried out in the presence of a mineral charge.

4. The process of claim 3, wherein said mineral charge is sand.

5. The method of claim 3, wherein the sand has a particle size between about 210 and 350 μm, and the concentration of solids in the pulp is between 50 and 80%.

* * * * *